US007929374B1

(12) United States Patent (10) Patent No.: US 7,929,374 B1
Grimmett (45) Date of Patent: Apr. 19, 2011

(54) MULTI-STATIC OBJECT TRACKER USING SPECULAR CUE INITIATION AND DIRECTED DATA RETRIEVAL

(75) Inventor: Douglas J. Grimmett, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 428 days.

(21) Appl. No.: 12/260,133

(22) Filed: Oct. 29, 2008

(51) Int. Cl.
 *G01S 15/02* (2006.01)
(52) U.S. Cl. .......................................................... 367/98
(58) Field of Classification Search .................... 367/98, 367/93, 136, 129
 See application file for complete search history.

(56) References Cited

U.S. PATENT DOCUMENTS 7,668,045 B2 * 2/2010 Lee ................................. 367/98

OTHER PUBLICATIONS

Grimmett; Multistatic Target Tracking Using Specular Cue Initiation and Directed Data Retrieval; http://isif.org/fusion/proceedings/fusion08CD/papers/1569107257.pdf; 2008; pp. 1799-1806.*
D. Grimmett et al., Contact-Level Multistatic Sonar Data Simulator for Tracker Performance Assessment, 9th Intl Conf on Information Fusion Proceedings, Florence, IT, 2006.
H. Cox, Fundamentals of Bistatic Active Sonar, in Underwater Acoustic Data Processing, Kluwer Academic Publishers, 1989.
S. Coraluppi, Multistatic Sonar Localization, IEEE Journal of Oceanic Engineering, vol. 31, No. 4, Oct. 2006.
S. Coraluppi, Multistatic Sonar Localization Analysis, NURC Technical Report SR-377, Jun. 2003.
D. Grimmett, Reduction of False Alarm Rate in Distributed Multistatic Sonar Systems through Detection Cueing, Proceedings of the IEEE Oceans'07 Conf, Jun. 2007, Aberdeen, Scotl.
D. Grimmet et al., Modeling Specular Occurrence in Distributed Multistatic Fields, in Proceedings of the IEEE Oceans'08 Conference, Jul. 2008, Kobe, Japan.
D. Grimmett, Multistatic Target Tracking Using Specular Cue Initiation and Directed Data Retrieval, Proceedings of the 1st Int'l Conf on Information Fusion, Jul. 2008, Cologne.
D. Grimmett, Evaluation Metrics for Specular Occurrences in Distributred Multistatic Fields, Proceedings of TICP MAR TP-9 Annual Meetingg, Nov. 2007, Adelaide, Austrailia.
S. Coraluppi and C. Carthel, Progress in Multistatic Sonar Localization and Tracking, SACLANTCEN Report SR-384, Dec. 2003.

* cited by examiner

*Primary Examiner* — Dan Pihulic
(74) *Attorney, Agent, or Firm* — Arthur K. Samora; Kyle Eppele

(57) ABSTRACT

Methods, computer-readable means, and systems for minimizing false alarm rates and operator loading while conducting multistatic active sonar operations are disclosed. A plurality of sensor nodes is established, with each sensor node including an active sonar source, and a receiver. Each sensor node has a local storage center, and each node is connected to a data fusion center. During active sonar operations, a high threshold (HTH) and a low threshold (LTH) setting is established. For each sensor node, all sonar return data above the LTH setting are stored at its respective storage center. The HTH is set so that only specular echo returns exceed the HTH; when the HTH setting is exceeded, the fusion center retrieves LTH data from each storage center corresponding to the same specular echo return, in order to establish a track for the contact.

14 Claims, 5 Drawing Sheets

MULTI-STATIC OBJECT TRACKER USING SPECULAR CUE INITIATION AND DIRECTED DATA RETRIEVAL

FEDERALLY-SPONSORED RESEARCH AND DEVELOPMENT

This invention (Navy Case No. 99,243) is assigned to the United States Government and is available for licensing for commercial purposes. Licensing and technical inquires may be directed to the Office of Research and Technical Applications, Space and Naval Warfare Systems Center, Pacific, Code 2112, San Diego, Calif. 92152; voice (619) 553-2778; email T2@spawar.navy.mil.

FIELD OF THE INVENTION

The present invention pertains generally to sonar systems. More particularly, the present invention pertains to active sonar systems that exploit the specular echo phenomenon to selectively retrieve sonar data in a manner that minimize false alarm rates.

BACKGROUND OF THE INVENTION

Distributed multistatic active sonar networks have the potential to increase anti-submarine warfare (ASW) performance against small, quiet, threat submarines in the harsh clutter-saturated littoral and the deeper open-ocean environments. This improved performance comes through the expanded geometric diversity achieved with multiple sources and receivers, and results in increased probability of detection, area coverage, object tracking, classification, and localization through cross-fixing.

However, the increased number of sensors in a multistatic network results in corresponding increases in the data rate, processing, communications requirements, and operator loading. Without an effective fusion of the multistatic data, the benefits of such systems will be unrealizable. Thus, effective, robust, and automated multi-sensor data fusion and tracking algorithms become an essential part of such systems. While much progress has recently been made in the prior art, however, unacceptably high false alarm rates for the data fusion algorithms are still a major issue for such systems. Multistatic fusion algorithms are still challenged to automatically output a sufficiently low false track/alert rate to the operator in reverberation- and clutter-rich conditions, while at the same time providing quality track information for sonar contacts that are detected. Additionally, communication links may not have the throughput capacity to transfer all of the associated data from each of the multistatic nodes to a fusion center.

In view of the above, there is a need for a multistatic active sonar system and method that minimizes false alarm rates by taking advantage of specular echo phenomena of flat or cylindrical objects. There is a further need for a multistatic active sonar system and method that minimizes communication and operator loading by selective transmission of sonar data for track fusion. There is still further need of a multistatic active sonar system and method that uses a dual threshold signal-to-noise ratio scheme to filter out unwanted reverberation and clutter without any significant loss in track quality.

SUMMARY OF THE INVENTION

Embodiments of the present invention provide systems, methods and computer-readable means for accomplishing methods that minimize false alarm rates while conducting active sonar operations. To do this, a plurality of sensor nodes is established. Each sensor node includes an active sonar source, as well as a receiver, and the sensor nodes conduct active operations by "pinging" (emitting active sonar transmission) at regular intervals.

For the systems and methods according to several embodiments of the present invention, the sensor nodes are each connected to a respective local data storage center. For each sensor node, the data from the active sonar operation of each sensor node is stored at its respective data storage center, for subsequent retrieval. The sensor nodes are each in data link communication with a fusion center, which selectively retrieves the data from the storage centers when predetermined conditions are met.

The system and methods of the present invention establish a high threshold (HTH) and low threshold (LTH) signal-to-noise ratios (SNR's) for the system; both the HTH and LTH are predetermined according to the type of operating environment (open-ocean or littoral), operator experience, and fusion center processor capabilities encountered, and the HTH is set high enough to reject most clutter and non-specular contact echoes, but low enough that specular echoes exceed the HTH.

Once the HTH is exceeded, the aforementioned condition is met, and the fusion center retrieves data from each local storage center that corresponds to the same ping that exceeded the HTH, in order to initiate a track for a contact. Since specular echoes are indicative of a beam aspect for an object, one of two track headings is postulated for the contact. Based on the postulated track course, data snippets from previous time intervals are retrieved to continue the reverestime track and establish a course and speed for the target object. Based on the reverse-time, forward-time tracking continues with specular and non-specular echoes within snippets retrieved and used to update subsequent track estimates. If a future HTH cue does not correlate with an established track, a new track is established, and the process is repeated.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
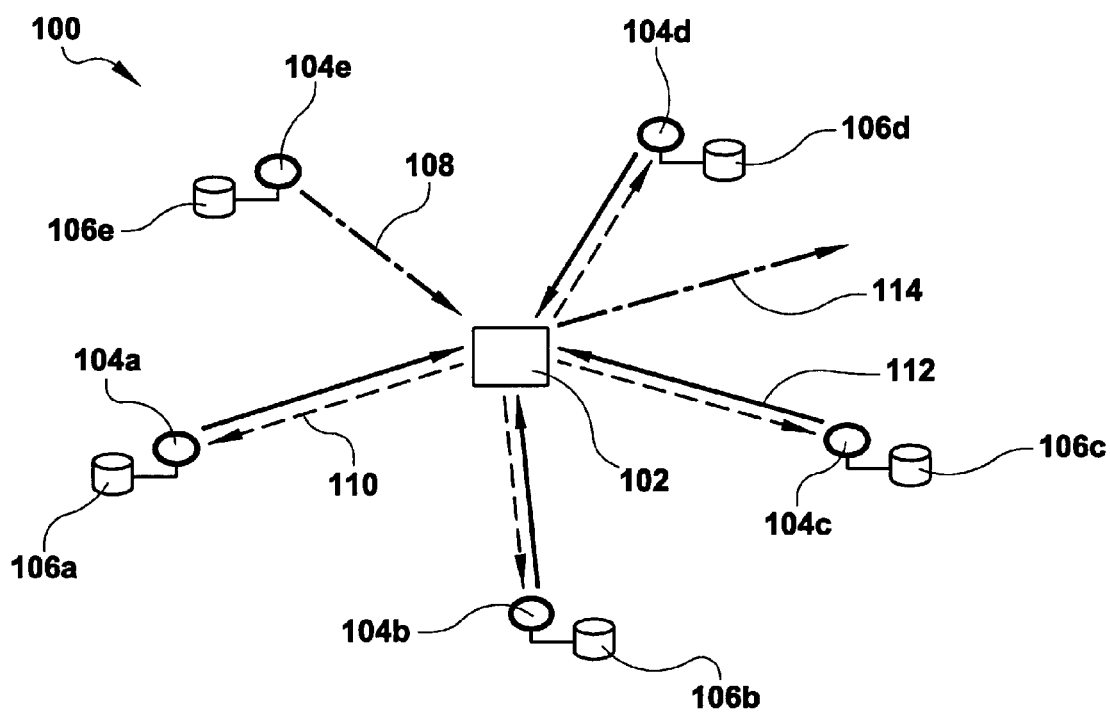
FIG. 1 is a block diagram of the multistatic sonar system of several embodiments of the present invention, which shows a plurality of sensor nodes, local data storage centers and data fusion center.

Referring now to the Figures, and more specifically to FIG. 1, a multistatic sonar tracking system in accordance with an embodiment of the present invention is shown and is designated by reference character 100. As shown, system 100 includes a fusion center 102, and a plurality of sensor nodes, of which nodes 104a-104e are representative, that are linked to fusion center 102 via two way data links (not shown). Each sensor node is connected to a respective local data storage center 106; the sensors nodes 102 conduct active sonar operations and stow the resultant data in the local data storage centers 106.

Upon receiving a specular cue 108 from a representative node (in this case, node 104e), fusion center 102 initiates a data request to the other nodes 104a-104d for locally stored data that geographically corresponds to the specular cue, as indicated by arrows 110a-110d. In response, data snippets 112 are transmitted to fusion center 102 and fused into an output track for an object, as indicated by arrow 114. The manner in which the above steps are accomplished is discussed in greater detail below.

Figure 2:
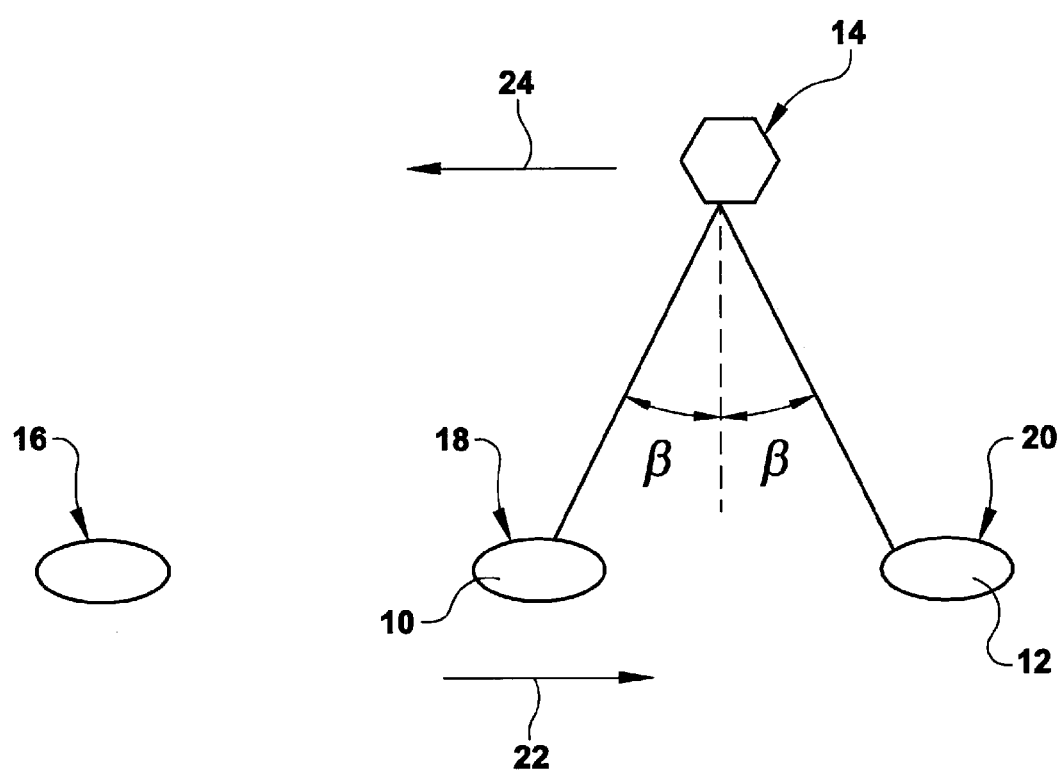
FIG. 2 is an illustration of the multistatic sonar system of FIG. 1 in an operating environment with four sensor nodes shown, along with a detected active sonar contact.

FIG. 2 is an example of the multistatic active sonar system shown in FIG. 1. For the multistatic system shown in FIG. 2, three ships 16, 18, and 20 are in an in-line formation and heading east, as indicated by arrow 22. For purposes of illustration, ships 16, 18 and 20 have an inter-ship spacing of approximately thirteen kilometers (13 km) and are traveling at 5 kts. Object 14 is shown to the north of the ships 16, 18 and 20 and is heading west, as indicated by arrow 24, at 4 kts.

For the embodiments of the present invention, an active sensor node is defined as a source 10 for active sonar transmissions and a receiver 12. Therefore, and assuming that ship 16 has both a source and receiver, ship 18 has a source, and ship 20 has a receiver; a first node could be defined as the source and receiver on ship 16. This node is a monostatic node because both the source and receiver are on the same ship. Additionally, a bistatic second node could be defined as the source from ship 16 and the receiver from ship 20. A bistatic third node could be defined as the source from ship 18 and the receiver from ship 16. A bistatic fourth node could be defined as the source from ship 18 and receiver from ship 20. In this manner, a plurality of sensors nodes can be defined, with the relationship between the nodes and their manner of interaction being more fully described below. Ships 16, 18 and 20 each have a co-located local data storage center 104 (some ships may have more than one data storage center). The fusion center 102 shown in FIG. 1 could be located on one of ships, 16, 18 or 20, or it may be located remotely from the ships, according to the desires of the user.

Figure 3:
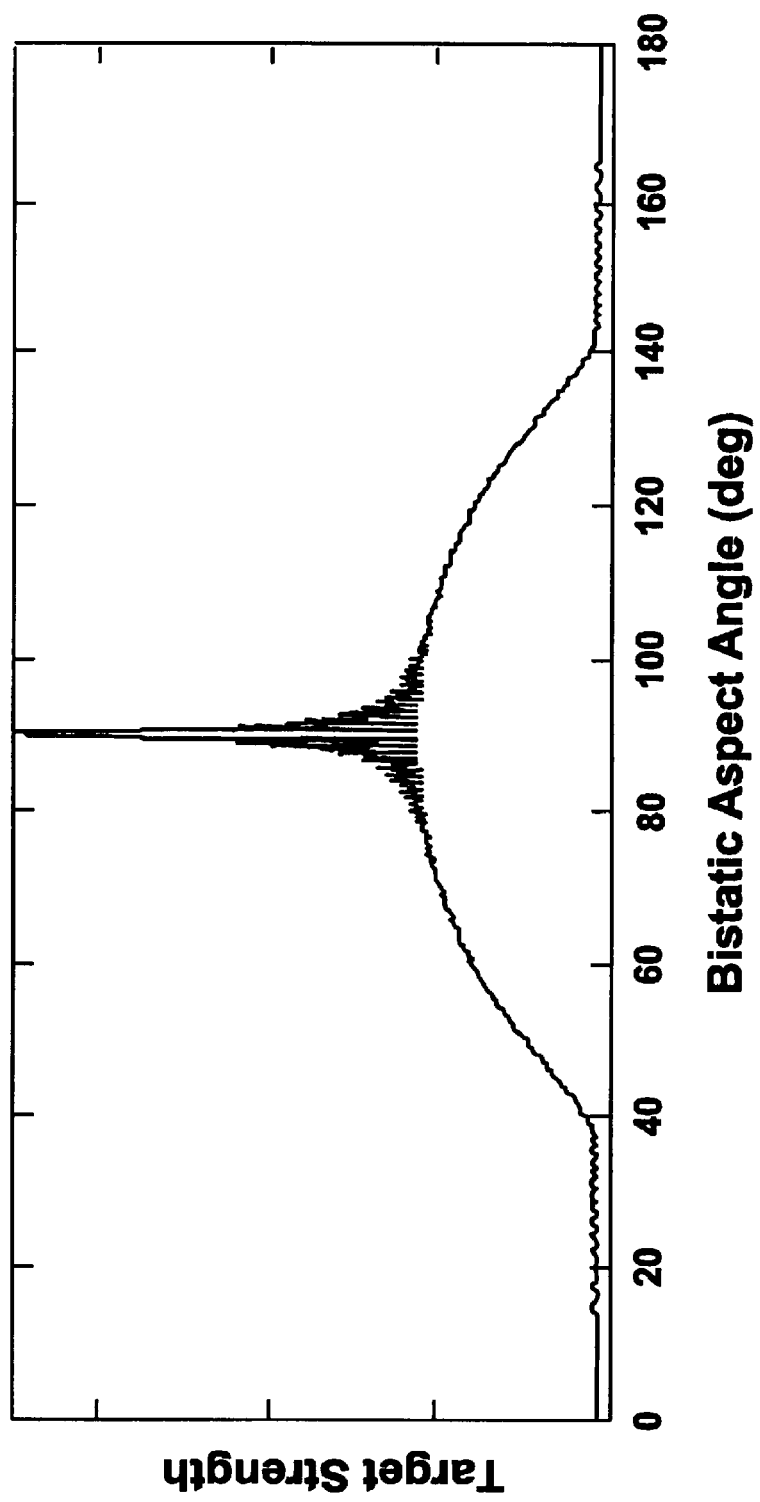
FIG. 3 is a graph of echo strength versus bistatic angle, which illustrates the specular echo phenomenon.

The multistatic sonar tracking system of the present invention is based on the exploitation of an object's high strength specular echoes, which occur when a sonar source 10 and receiver 12 are positioned with symmetric angles around the beam aspect of a cylindrical object 14, as shown in FIG. 2. When this specular condition occurs, it will yield a very high-strength object echo relative to other geometries. FIG. 3 is a graphical depiction of this phenomenon. As shown in FIG. 3, echo strength from an object echo increases as the bistatic aspect angle between the source and receiver increases from 0 to 90. This is particularly true when the bistatic aspect angle is at or near ninety degrees ($\beta=90°$); at $\beta=90°$, the echo strength is maximized, and then slowly decrease to a minimum at $\beta=180°$.

Figure 4:
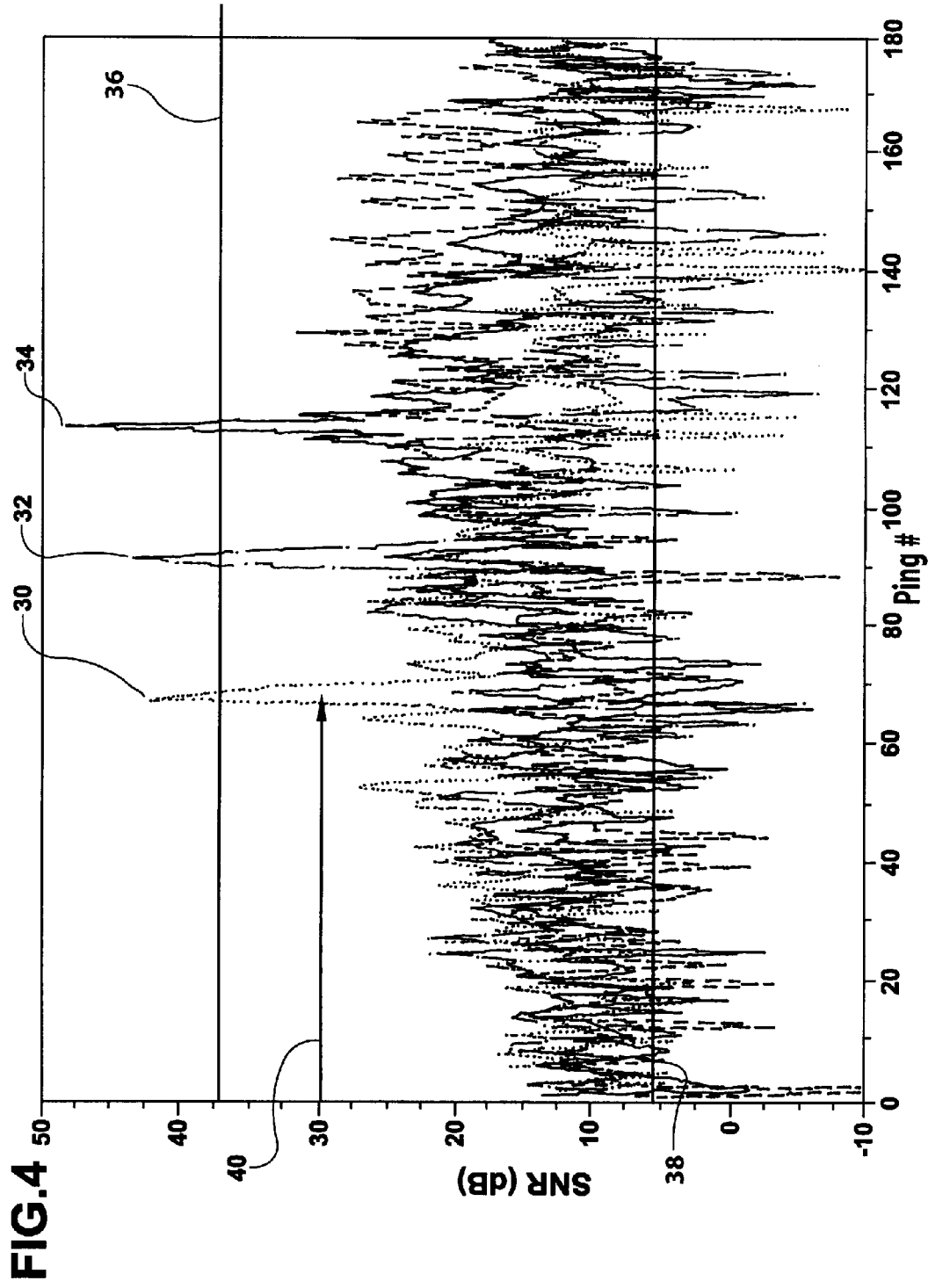
FIG. 4 is a graph of an object signal-to-noise ratio (SNR) versus time (ping number), which illustrates the specular echo effect for a cylindrical object, and which further illustrates the specular cuing aspect according to several embodiments of the present invention; and, FIG. 5 is a block diagram that illustrates the steps of the method according to several embodiments of the present invention.

FIG. 4 is a graph that shows an exemplary detection of signal-to-noise ratios (SNR's) of sonar pings, or active sonar transmissions, for the scenario outlined in FIG. 2. For the graph of FIG. 4, active pings are submitted by each sensor node every minute for three hours, for a total of one hundred and eighty pings. There are a total of 720 scans of data in the scenario, which correspond to 4 pings per minute, one ping for the four nodes defined above. As can be seen from FIG. 4, there are often large fluctuations in SNR's from ping-to-ping.

From FIG. 4, it can be seen that very high strength acoustic echoes are present around pings 70, 95, and 117, as indicated by respective points 30, 32 and 34. These points correspond to the specular occurrences for the scenario illustrated in FIG. 2. For example, ping 70 corresponds to the first specular opportunity for this scenario, which occurs during specular echoes from the fourth bistatic node described above, when source from ship 20 and receiver from ship 18 are positioned with equal, symmetric angles ($\beta$) from the object 14 beam aspect, as illustrated in FIG. 2.

By setting a higher-than-normal threshold setting (HTH), which is indicated by line 36 in FIG. 4, the user can reject most false alarm clutter, while still detecting the specular echoes. These specular echoes are used as cues to retrieve additional detection data available from the other sensor nodes in the multistatic field described above. The retrieved data from other sensor nodes are referred to as "snippets", because they will be small subsets of the complete data which has been generated and stored on each of the local data storage centers 106 for the sensor nodes 104. In this manner, the operator loading and sensor loading (as well as the loading on the fusion center processor and the loading on the sensor node-fusion center data link) can be drastically reduced. Instead of processing and correlating data from all four nodes continuously, only the relevant portions of data are retrieved and processed to "stitch" together tracks that are reflective of actual contacts.

A snippet's boundary and size is related to the specular cue measurement's area of uncertainty. One way to calculate such boundaries that is known in the prior art can be found in Reduction of False Alarm Rate in Distributed Multistatic Sonar Systems through Detection Cueing, D. Grimmett, Proceedings of the IEEE Oceans '07 Conference, June 2007, Aberdeen, Scotland. Once a snippet has been identified and retrieved, the normal-level lower detection threshold (LTH) is applied within it, to identify additional potential object echoes. Stated differently, those echoes having a SNR above the LTH line 38 in FIG. 3 that are within the accessed data snippet are designated as object echoes. This data is passed over the afore-mentioned two-way data link to fusion center 102 (See FIG. 1). The data snippets are fused by fusion center 102 into an output track. Thus, an output track 114 is initiated and the track's object state estimates (and projections) are used as the cues for subsequent measurements.

Using this scheme, detection contacts can be retrieved for past sonar pings, and tracks can be generated, both forward and backward in time. Such a cueing approach allows for a reduction in the amount of data which would normally be input into the fusion-tracking algorithm, enabling it to generate fewer false tracks. The main advantage of this approach is to greatly reduce the false alert rate, sensor communications requirements, and operator loading. The concept assumes that there will be a statistically sufficient number of specular occurrences to detect and initiate tracks. It also assumes that the increased detection latency (the time from the start of active sonar operations to the first specular occurrence, see arrow 40 in FIG. 4) needed to wait for specular detection opportunities to occur is within the surveillance operation's reporting timeframe requirements. It should be appreciated, however, the number sensor nodes, as well as the geometry of the sensor node arrangement, could be manipulated to decrease the detection latency of the system, if desired. The manner of manipulation is described more fully in Contact-Level Multistatic Sonar Data Simulator for Tracker Performance Assessment, D. Grimmett and S. Coraluppi, Proceedings of the 9$^{th}$ International Conference on Information Fusion, July 2006, Florence, Italy.

The manner in which the data snippets are fused is worth of note. Specifically, the tracking algorithm assumes that each source-receiver node produces multiple "contacts" (corresponding to clustered echo energies) with measurements of time delay, τ (from ping transmit time) and bearing (from the receiver). As known in the prior art (See H. Cox, Fundamentals of Bistatic Active Sonar, in Underwater Acoustic Data Processing, Kluwer Academic Publishers, 1989), the range of a contact from the receiver for a bistatic sonar can be obtained by:

$$r = \frac{c^2\tau^2 - \Delta^2}{2(c\tau - \Delta\cos\alpha)} \quad (1)$$

where Δ is the distance between the source and receiver, α is the difference between the angle from the receiver to the object and the angle from the receiver to the source. c is the speed of sound in water. Using this range and the bearing, the contact measurements may be mapped into an x-y position, in Cartesian coordinates. Contacts whose amplitudes exceed the low threshold (LTH) but not the high cue threshold (HTH) will provide measurements of object state position as:

$$Z_{LTH} = [x^m y^m]^T. \quad (2)$$

This use of Cartesian measurements introduces a bias error in localization. A method for de-biasing bistatic Cartesian measurements has been derived, and is incorporated into the methods of several embodiments of the present invention. This de-biasing method is known in the prior art and is described more fully in S. Coraluppi and C. Carthel, Progress in Multistatic Sonar Localization and Tracking, SACLANT-CEN Report SR-384, December 2003. Values (standard deviations) for the following errors can be determined by the user, according to their knowledge of the sonar system characteristics and the local operating environment. It can be assumed that the measurements have uncertainty errors with standard deviations as listed in Table 1.

TABLE 1

| Measurement Errors. | |
|---|---|
| Arrival time | $\sigma_\tau$ |
| Bearing | $\sigma_\theta$ |
| Array heading | $\sigma_\phi$ |
| Speed of Sound | $\sigma_c$ |
| Source position | $\sigma_x S$, $\sigma_y S$, and $\sigma_{xy} S$ |
| Receiver position | $\sigma_x R$, $\sigma_y R$, and $\sigma_{xy} R$ |

Starting with these measurement errors, and using the analytic localization expressions derived in S. Coraluppi, Multistatic Sonar Localization Analysis, NURC Technical Report SR-377, June 2003, the errors in contact localization in Cartesian coordinates ($\sigma_x$, $\sigma_y$, and $\sigma_{xy}$) can be obtained. The measurement error covariance matrix is then expressed as:

$$R_{LTH} = \begin{bmatrix} \sigma_x^2 & \sigma_{xy} \\ \sigma_{xy} & \sigma_y^2 \end{bmatrix}. \quad (3)$$

Contacts whose amplitudes exceed the high cue threshold (HTH) are assumed to be specular echoes, and in addition to an object position measurement, a object heading measurement is obtained. Objects in the specular condition have a heading which is tangential to the bistatic range ellipse at the contact location. There will be an ambiguity between two heading assumptions; one clockwise and one counter-clockwise (180 degrees out of phase) about the ellipse at this point of tangency. In this case, the measurement provides both positional and heading information in the object state as $$Z_{HTH} = [x^m y^m \dot{x}^m \dot{y}^m]^T \quad (4)$$

where $x^m$ and $y^m$ are the same as before and $$\dot{x}^m = v_T \cos H \quad (5)$$

$$\dot{y}^m = v_T \sin H, \quad (6)$$

where $v_T$ is the assumed or estimated object speed and H is the object heading corresponding to the specular condition. We assume the uncertainty in the object speed and specular heading are given by $\sigma_{v_T}$ and $\sigma_H$, respectively. Following the same small-error linearization method in S. Coraluppi described above, errors in object velocity can be derived. The velocity errors in Cartesian coordinates are given as:

$$\sigma_{\dot{x}}^2 = \sigma_{v_T}^2 \cos^2 H + \sigma_H^2 v_T^2 \sin^2 H \quad (7)$$

$$\sigma_{\dot{y}}^2 = \sigma_{v_T}^2 \sin^2 H + \sigma_H^2 v_T^2 \cos^2 H \quad (8)$$

$$\sigma_{\dot{x}\dot{y}} = (\sigma_{v_T}^2 - \sigma_H^2 v_T^2) \sin H \cos H \quad (9)$$

The velocity error covariance matrix can be described as:

$$R_v = \begin{bmatrix} \sigma_{\dot{x}}^2 & \sigma_{\dot{x}\dot{y}} \\ \sigma_{\dot{x}\dot{y}} & \sigma_{\dot{y}}^2 \end{bmatrix}. \quad (10)$$

Thus, the measurement error covariance for this case is then given as the following 4×4 matrix:

$$R_{HTH} = \begin{bmatrix} R_{LTH} & 0_{2,2} \\ 0_{2,2} & R_v \end{bmatrix}. \quad (11)$$

In the case when a current object speed estimate is unavailable (as in the case of a track initiating specular cue), an initial value and uncertainty of the object speed is assumed.

A logic-based track initiation and termination scheme is used. Scans from multiple sensors, occurring at the same (ping) time, are ordered in an arbitrary way. After cuing by a specular echo when the a return echo has exceeded the HTH, a track is initiated upon the successful association of contacts from M out of N successive scans of data snippets that have been retrieved from local storage centers 106. The ratio of M to N can be determined by the user according to the fusion center processing capabilities and the type of operating environment that is encountered (open-ocean, littoral, etc.) Track termination can be made when a predetermined number of consecutive scans of data are processed without providing associable contacts.

The data fusion algorithm cited above is described in greater detail in "Multistatic Target Tracking Using Specular Cue Initiation and Directed Data Retrieval" by Douglas C. Grimmett, Proceedings of the 11$^{th}$ International Conference on Information Fusion, July 2008, Cologne, Germany, which is incorporated herein by reference. It should be appreciated that other algorithms could be used to fuse the data snippets in accordance with the present invention.

Once a track has been initiated, subsequent updates to the track are made using the equations of the Kalman Filter, in a manner known in the prior art. Measurements above the LTH (but below the HTH) and selected for association will update the track using only positional measurements and error covariance. Cue measurements above the HTH will first be associated to existing tracks, if possible, otherwise they will initiate new tracks. If updating a track, the cue measurement will provide both object position and object heading information.

Data associations between existing tracks and new measurements are made using the statistical "nearest neighbor" method. The tracks are ordered according to length, with longer tracks getting priority over shorter tracks for new association assignments. Only "validated" contacts are considered for association to existing tracks. Validated contacts are those that are fall within a suitable association gate and which exceed the low threshold (LTH). The data snippet size may be scaled to achieve a desired level of association probability. The contact with the highest association probability (nearest statistical neighbor) within the snippet is used to update the track. Once a contact has been assigned to a confirmed track, it becomes unavailable for association to other tracks. Only validated contacts need to be retrieved and sent over the communications link for fusion, which greatly reduces multistatic communication throughput requirements for the communications link.

Figure 5:
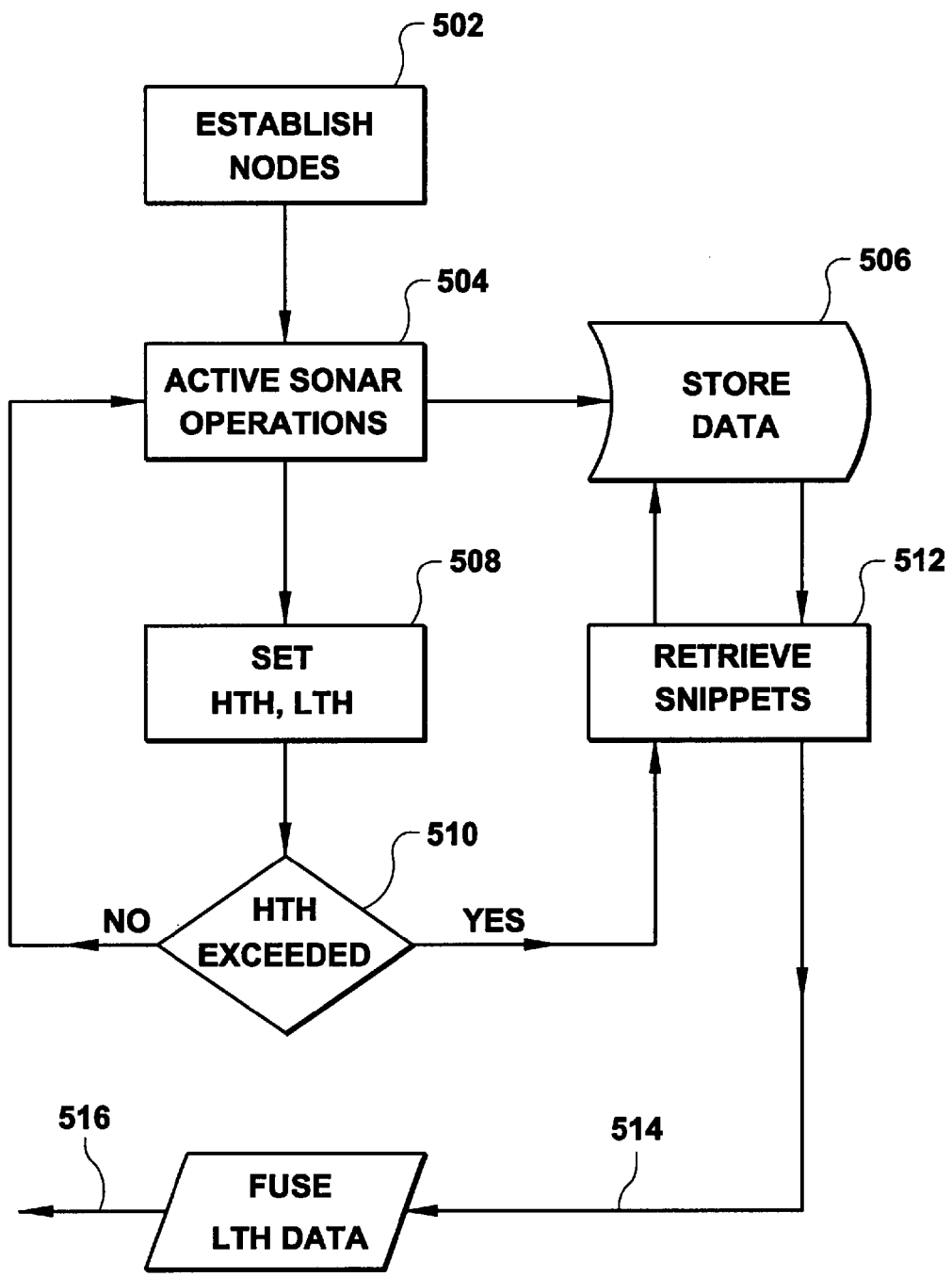

Referring now to FIG. 5, a diagram of the steps for accomplishing the methods of minimizing false alarm rates during active sonar operations, according to several embodiments of the invention, is shown. Initially, and as indicated by block 502, a multistatic system of sensor nodes is established. The amount and spacing of sensor nodes is determined by the operator, according to the operating environment and user needs. For example, if a lesser latency period is desired, more sensor nodes may be required to decrease the latency period before the initial specular cue is established. Each sensor node includes a receiver and an active source, as described above, although the receiver and source do not necessarily need to be on the same platform.

As shown by block 504 in FIG. 5, for the next step of the method, each sensor node conducts active sonar operations. The active sonar operations result in a series of return echo data having widely varying SNR's, as indicated by FIG. 4. Each sensor has an associated local data storage center 106, and the return echo data is stored in the local storage centers, for further selective retrieval, as indicated by block 506.

As shown by block 508 in FIG. 5, the methods of certain embodiments of the present invention include setting the high threshold (HTH) and low threshold (LTH) SNR levels for the system. The HTH is set so that only specular echoes exceed the HTH, while the LTH is set so that most of the return echo data is passed to the local storage centers as stored data. For purposes of this disclosure, and as indicated by FIG. 4, the HTH is set at 36 dB, while the LTH is set at 8 dB. It should be appreciated, however, that the HTH and LTH could be adjusted according to the type of operating environment (i.e., littoral, open ocean), the number of contacts expected in the operating environment, the processing capabilities of the system, and the expertise of the human operator.

As indicated by block 510 in FIG. 5, if the HTH is exceeded, which means that a specular echo has occurred. Data snippets that correspond to the ping (active sonar transmission) are selectively retrieved as indicated by arrow 512.

The data snippets are input (arrow 514) into a fusion center, and the snippets are fused at step 516 into an output track via a processor or similar means. To do this, a beam aspect for the object is assumed, and that the object has one of two heading assumptions. Stated differently, once a specular HTH cue is obtained, two tentative tracks are declared, corresponding to the two specular heading assumptions. Contacts contained within data snippets that have been retrieved from the data storage centers of sensor node other than the cuing sensor node, and previous pings, are evaluated for possible association and reverse-time track update. If the M/N criterion described above is met, backtracks become confirmed. Reverse-time tracking continues, in order to capture as much track history as possible; once the M/N criterion is not met, the backtrack is terminated.

Once the two backtracks have both terminated, the more probable backtrack is selected, using track length and heading stability criteria to resolve the direction of travel of the track. The contacts belonging to the correct backtrack are then re-filtered in the forward-time direction, until the current time (of the initiating specular cue) is reached. With this re-filtering, the best possible track estimate at the time of the cue is obtained. At this point the track continues in the forward-time direction updating with measurements found within the retrieval snippets of future scans.

Subsequently occurring specular detections update track position and heading, if they are determined to be the nearest neighbor contact in the snippet. Specular detections which are not assigned to existing tracks become new tentative tracks, and the process repeats. Current forward-direction tracks will terminate when the termination criterion is met.

As also shown in FIG. 5, if the HTH is not exceeded, the active sonar operations continue until a specular cue above the HTH is received.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It is understood that many additional changes in the details, materials, steps and arrangement of parts, which have been herein described and illustrated to explain the nature of the invention, may be made by those skilled in the art within the principal and scope of the invention as expressed in the appended claims. More specifically, this invention has been made in the context of active sonar (echolocation) for ASW operations. However, several embodiments of the invention may have applicability to any other potential multistatic systems that use either echo-location (sonar) or reflected electromagnetic energy (including radar) as a basis for detection and tracking of cylindrical or flat objects, when such system have a false alarm problem, or when such systems have operational problems due to insufficient communications link throughput capabilities.

What is claimed is:

1. A method for minimizing false alarm rates while conducting active sonar operations, said method comprising the steps of:
  A) establishing a plurality of sensor nodes, each said node having a local data storage centers;
  B) conducting active sonar operations with each said node;
  C) storing data from said active sonar operations at said local data storage centers;
  D) setting high threshold (HTH) and low threshold (LTH) signal-to-noise ratios (SNR's) for said sensor nodes; and,
  E) selectively retrieving LTH data snippets from said local data storage centers when echoes from an object resulting from said step B) exceed said HTH.

2. The method claim 1, further comprising the steps of:
  F) linking said local storage centers to a data fusion center;
  G) fusing said LTH data snippets at said data fusion center to yield track information for said object.

3. The method of claim 2, wherein said step D) is accomplished so that said HTH is only exceeded when specular echoes are received at said sensor nodes.

4. The method of claim 3, wherein said step D) is accomplished so that said HTH and said LTH are set according to a littoral operating environment.

5. The method of claim 3, wherein said step D) is accomplished so that said HTH and said LTH are set according to an open-ocean operating environment.

6. The method of claim 2, wherein said step B) is accomplished at regular time intervals, and further wherein step G) further comprises the steps of:
  G1) assuming that said object has a beam aspect;
  G2) postulating one of two tracks for said object based on said beam aspect; and,
  G3) associating said LTH data snippets retrieved from said step D) from previous said time intervals to resolve said track.

7. The method of claim 6 further comprising the steps of:
  H) based on said track, predicting future time intervals when said HTH SNR will occur; and,
  I) conducting said step E) at said predicted time intervals;
  J) updating said track if said retrieved LTH data snippets from said step G3 are associated with said track.

8. The method of claim 7 further comprising the step of:
  K) initiating a new track if said LTH data snippets from said step G3 cannot be associated with said track from said step J).

9. A computer readable storage medium storing instructions that, when executed by a computer, cause the computer to perform a method of minimizing false alarms when conducting active sonar operations with a plurality of sensor nodes, each said node having a local data storage center, said method comprising the steps of:
  A) locally storing data resulting from said active sonar operations at said local data storage centers;
  B) setting high threshold (HTH) and a low threshold (LTH) signal-to-noise ratios (SNR's) for said sensor nodes;
  C) selectively retrieving LTH data snippets from said local data storage centers when echoes from an object resulting from said step B) exceed said HTH; and,
  D) fusing said LTH data snippets to yield track information for said object.

10. A system for minimizing false alarms during active sonar operations, said system comprising:
  a plurality of active sensor nodes;
  a plurality of local data storage centers, each said local storage medium corresponding to a respective sensor node;
  a fusion center connected to said sensor nodes via a data link;
  said system having a high threshold (HTH) and a low threshold (LTH) signal-to-noise (SNR); and,
  said fusion center selectively retrieving data snippets above from said local storage media when said HTH SNR is exceeded.

11. The system of claim 10 wherein said data snippets have an SNR above said LTH.

12. The system of claim 10 wherein said HTH SNR is only exceeded when specular echoes are received at said sensor nodes.

13. The system of claim 10, wherein said HTH SNR and said LTH SNR are preset according to a littoral operating environment.

14. The system of claim 9, wherein said HTH SNR and said LTH SNR are preset according to an open-ocean operating environment.

* * * * *